(12) United States Patent
Baca et al.

(10) Patent No.: US 9,497,148 B2
(45) Date of Patent: Nov. 15, 2016

(54) CONTEXT-BASED AUTOMATED/INTELLIGENT CONTENT MANAGEMENT

(71) Applicants: Jim S. Baca, Corrales, NM (US); David Stanasolovich, Albuquerque, NM (US);
(Continued)

(72) Inventors: Jim S. Baca, Corrales, NM (US); David Stanasolovich, Albuquerque, NM (US);
(Continued)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 14/580,804

(22) Filed: Dec. 23, 2014

(65) Prior Publication Data

US 2016/0094500 A1 Mar. 31, 2016

Related U.S. Application Data

(60) Provisional application No. 62/056,535, filed on Sep. 27, 2014.

(51) Int. Cl.
*G06F 15/16* (2006.01)
*H04L 12/58* (2006.01)
(Continued)

(52) U.S. Cl.
CPC ............... *H04L 51/08* (2013.01); *H04L 51/20* (2013.01); *H04L 51/34* (2013.01); *H04L 67/1095* (2013.01); *H04W 4/02* (2013.01)

(58) Field of Classification Search
USPC ......................................... 709/206, 203, 202
See application file for complete search history.

(56) References Cited

U.S. PATENT DOCUMENTS

| 2003/0140088 A1* | 7/2003 | Robinson ............... G06Q 10/10 709/202 |
| 2004/0018841 A1* | 1/2004 | Trossen ............ H04W 36/0016 455/436 |

(Continued)

*Primary Examiner* — Jude Jean Gilles
(74) *Attorney, Agent, or Firm* — Garrett IP, LLC

(57) ABSTRACT

Methods and systems to predictively determine to perform a computing activity based on contextual information. Context-based criteria are defined based relationships between user-computing activity and contextual information, and are evaluated based on updated contextual information to determine whether to perform the computing activity. Context-based criteria may be defined to predictively identify content to be transferred/synchronized/updated and/or deleted, and/or to select one or more of multiple devices to receive content. Content may be selectively synchronized across devices of a user and/or shared with another user(s). Context-based criteria may relate to, without limitation, location, activity, computer-usage patterns, motion, and/or schedule of a user, device location, user/device proximity, relationships amongst content, users, and/or devices. Context-based computing environment parameters may be provided to pre-loaded content on device (e.g., store, open, and/or configure an operating system, application, and/or resource), with little or no user interaction.

20 Claims, 8 Drawing Sheets

(71) Applicants: Tobias M. Kohlenberg, Portland, OR (US)

(72) Inventors: Tobias M. Kohlenberg, Portland, OR (US)

(51) Int. Cl.
*H04L 29/08* (2006.01)
*H04W 4/02* (2009.01)

(56) References Cited

U.S. PATENT DOCUMENTS

| | | | | |
|---|---|---|---|---|
| 2005/0060365 | A1* | 3/2005 | Robinson | H04L 69/329 709/203 |
| 2011/0293019 | A1* | 12/2011 | Steinberg | H04N 19/61 375/240.25 |
| 2015/0046679 | A1* | 2/2015 | Gathala | G06F 9/3885 712/30 |

* cited by examiner

CONTEXT-BASED AUTOMATED/INTELLIGENT CONTENT MANAGEMENT

CROSS REFERENCE TO RELATED APPLICATIONS

This application claims the benefit of U.S. Provisional Patent Application No. 62/056,535, filed Sep. 27, 2014.

BACKGROUND

Computer users often transfer computer-readable content (e.g., a computer-readable file that includes audio, image, video, text, and/or numeric based data) amongst computing devices, to permit the user to access the content from another computing device and/or to share the content with another user.

Techniques to transfer computer-readable content amongst computing devices include copying or writing content from a first computing device to an interim storage device, and from the interim storage device to a second computing device.

The interim storage device may include a shared drive (e.g., a network-based drive), or a cloud-based drive that is remotely accessible to the first and second computing devices over a communication channel or medium, in which case a computer-readable link may have to be transmitted the second computing device to permit the second computing device to access or retrieve the content from the interim storage device.

The interim drive may include an electronic message (e.g., e-mail) server, in which case the content is attached to an e-mail sent from the first computing device, and retrieved at the second computing device.

The interim drive may include a transportable drive (e.g., a flash drive with a universal serial bus or USB interface), in which case the content is copied from the first computing device to the transportable drive, the transportable drive is physically transported to the second computing device, and the content is copied from the transportable device to the second computer.

In each example above, a user of the second computer must configure a computing environment for the content, which may include determining an appropriate storage location within the second computing device, selecting an application with which to access the content, and/or configuring parameters of the application, an operating system and/or a physical device/resource of the second computing device.

If the first computing device will become inaccessible to the user for a period of time (e.g., if the user is to attend a meeting and/or travel to another geographic location without the first computing device), failure to transfer the content to the interim drive prior to departure may preclude the user and/or other user(s) from accessing the content during the period of time, which may have adverse consequences (e.g., may impact a user's ability to review and/or revise the content from another location, present the content at a meeting, and/or share the content with a colleague prior to a meeting).

BRIEF DESCRIPTION OF THE DRAWINGS

For illustrative purposes, one or more features disclosed herein may be presented and/or described by way of example and/or with reference to one or more drawing figured listed below. Methods and systems disclosed herein are not, however, limited to such examples or illustrations.

Figure 1:
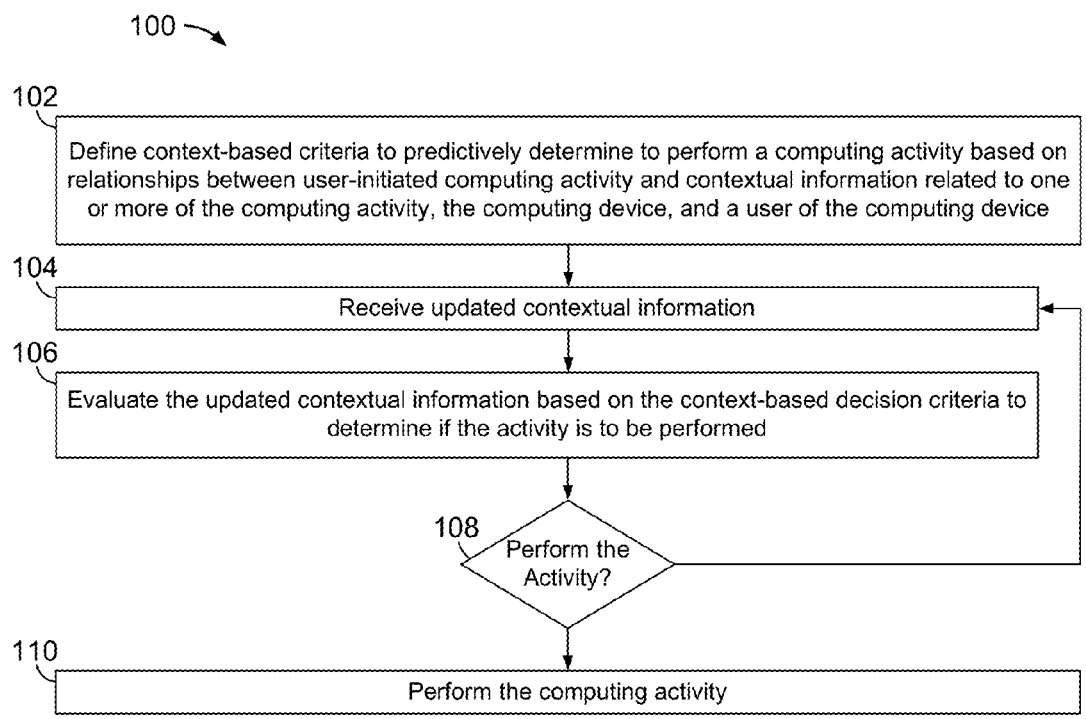
FIG. 1 is a flowchart of a method of predictively performing a computing activity based on user-computing activity and related contextual information.

In the drawings, the leftmost digit(s) of a reference number identifies the drawing in which the reference number first appears.

DETAILED DESCRIPTION

The term "computing device" is used herein to refer to a device that includes an instruction processor and memory (e.g., a computer readable medium). A computing device may include a stationary, transportable, portable, and/or mobile computing device, such as, without limitation, a desk-top computer, a laptop, notebook, and/or pad-type computing device, a mobile telephone, a smart-phone, a smart-watch, and/or other wearable smart device.

The term "content" is used herein to refer to computer-readable data, information, and/or instructions. Content may reside and/or be encoded within and/or transferred amongst computer readable media, such as, without limitation, processor memory or cache and/or an internal, external, and/or transportable/portable storage device). Content may include and/or represent, without limitation, audio, image data, video, a character (e.g., alphabetic, numeric, symbolic, and/or mathematical operator), and/or a character string or expression (e.g., a textual, mathematical, and/or logical expression, or a network address or uniform resource locator or identifier). Content may be associated with, identified by, defined as, and/or contained within a data object or structure, such as a computer file. The term "content," as used herein, is not limited to audio, image, and/or video media or media content.

FIG. 1 is a flowchart of a method 100 of predictively performing a computing activity based on user-computing activity and related contextual information.

For illustrative purposes, method 100 is described with respect to an example in which the computing activity includes transferring or synchronizing content amongst multiple computing devices, such as to predictively determine that (i.e., if and what) content of a first computing device is to be accessible from one or more other computing devices.

Method 100 may be configured to selectively transfer content amongst multiple computing devices of a user and/or to selectively provide content from a computing device of a first user to a computing device of a second user. Method 100 is not, however, limited to transferring or synchronizing content amongst multiple computing devices.

At 102, context-based criteria are defined to predictively determine to perform a computing activity based on relationships between user-computing activity (e.g., user-initiated transfers of content amongst the computing devices), and contextual information related to one or more of the computing activity, a computing device, and a user of the computing device.

As an example, from time to time, a user may transfer a particular or named computer file (e.g., a file named "ABC.doc") from a first computing device to a second computing device (e.g., from a workplace computer to a home-based computer). Analysis of contextual information may reveal that that the transfers, or a subset thereof, occur at the end of a workday (e.g., on weekdays, between 5:00 PM and 6:000 PM). Further analysis of contextual information may reveal that the transfers occur on days for which the user accesses the computer file on the workplace computer after 4:00 PM.

In this example, there is a relationship amongst the spreadsheet, and days and times at which the computer file is accessed on the workplace computer, and times at which the computer file transferred to the home-based computer. A context-based criterion may thus be defined to selectively transfer the computer file from the workplace computer to the home-based desktop computer, based on days and times at which the spreadsheet is accessed on the workplace computer.

Based on the relationship amongst the computer file ABC.doc, and days and times at which the computer file is accessed, a context-based criterion may be defined to predict when the spreadsheet is to be transferred to from the workplace computer. Such a criterion is referred to herein as a context-based decision criterion.

Where the computing activity involves multiple computing devices, device-based relationships may be detected. Further to the example above, the user may various transfer computer files from a first computing device of the user to one or more of multiple other computing devices of the user, and/or to a computing device of a another user.

Analysis of contextual information may reveal that the user transfers the computer file ABC.doc from the workplace computing to a portable computing device if the user is scheduled to travel and/or is scheduled to attend a meeting related to the first computer file. Further analysis of contextual information may reveal that the user otherwise transfers the computer file to a home-based desktop computer.

In this example, there is a device-based relationship amongst the computer file, the portable computing device, and travel and/or meeting plans of the user. There is also a device-based relationship amongst the computer file, the home-based computer, and travel and/or meeting plans of the user (i.e., the absence thereof). A context-based criterion may be defined for each of the relationships.

In other examples, context-based criteria may be defined based on relationships, correlations, and/or behavioral patterns related to user location, user activity, location of a computing device(s), proximity of a user to a computing device(s), scheduled events, contextual relationships between content and users, proximity of other users, and/or other contextual factor(s).

A context-based criterion defined to determine that (if (i.e., if and what) content of the first computing device is to be transferred or synchronized, may be referred to herein as a context-based decision criterion.

A context-based criterion defined to select one or more of multiple other computer devices to receive content from the first computing device, may be referred to herein as a context-based device selection criterion.

Context-based criteria may further include context-based configuration criteria to determine computing environment configuration parameters for content provided to a selected device, examples of which are provided below with reference to FIG. 2.

A context-based criterion may be defined or configured to mimic, predict, and/or anticipate an action, a desired action, an intended action, and/or a preference of a user.

A context-based criterion may be machine-learned and/or inferred from contextual information related to user computing activity, based on one or more machine-based learning, inference, and/or other artificial intelligence techniques.

A context-based criterion may include a rule (e.g., if/then), a computer readable look-up table, a machine-based predictive model, and/or a machine-based inference engine.

A context-based criterion may be based on an inherent relationship and/or an expressly defined relationship.

As an example, a model may be trained to correlate between prior user-computing activity and related contextual information (i.e., to "predict" prior user-computing activity from the related contextual information). Thereafter, updated contextual information is input to the model to permit the model to predict whether the computing activity is to be performed. In this example, a relationship between the computing activity and contextual information is inherently defined or embodied by the model.

As another example, a context-based criterion may be pre-defined based on an expressly defined relationship, and may be dynamically populated or configured based on activity of a particular user or users and/or an event. A context-based template criterion may be defined, for example, to send a computer file from a computing device of a first user to a computing device of a second user prior to electronically scheduled meetings between the users. Accompanying rules may be provided such that, if the first user sends a file as an e-mail attachment to a second user prior to a computer-scheduled appointment between the first and second users, the template criteria is populated with the name and/or location of the file, and with the e-mail address of the second user. Thereafter, the file will be sent as an e-mail attachment to the second user for subsequently scheduled meetings between the first and second users. Such a template criterion may be configurable to prompt the user to confirm prior to sending the file to the second user.

Methods and systems disclosed herein are not limited to these examples.

Detecting relationships at 102 and/or transforming the relationships into context-based criteria at 104 may include identifying a subset of available contextual information as relevant to (i.e., that correlates to), a user-initiated computing activity.

A context-based criterion defined at 102 may presented to a user for confirmation and/or alteration.

Contextual information and/or context-based criterion may include and/or relate to, without limitation:
  computing activity directed to the identified content on the first computing device;
  a behavioral pattern of the user;
  a schedule associated with the user;

physical location of the user;
a change in physical location of the user;
physical location of one or more of the computing devices;
physical proximity of the user to one or more of the computing devices;
user-activity;
user-motion; and/or
direction of motion of the user relative to a physical location of one or more of the computing devices.

Additional examples are provided further below.

Where a context-based criterion is based on user-activity, user-location, user-motion, and/or device location, relevant contextual information may include global position system (GPS) information, indoor location tracking information, audio, image, and/or video data captured by a computing device, and/or input from a human interface device or HID (e.g., a keyboard or cursor device). Image and/or video data may, for example, be used to determine if a user is facing a computing device, and/or in-motion towards and/or away from a computing device.

In an example, user-initiated transfers of content amongst computing devices are related to the user's proximity to the respective computing devices. In this example, a context-based decision criterion may be defined to evaluate contextual information indicative of and user location and/or motion to determine or predict that the user is transitioning away from a current computing device (e.g., based on computing activity, such as closing a file, and/or based on indoor location tracking information, and/or image/video data. In addition, a context-based device selection criterion may be defined to evaluate contextual information indicative of locations of other computing devices to select one or more of the devices to receive content from the current computing device.

A context-based decision criterion may be based, at least in part on the closing of a file on a computing device, to trigger a decision to synchronize the file with one or more other computing devices.

A context-based criterion may be specific or applicable to a named computer file (e.g., ABC.doc).

A context-based criterion may be applicable to a class of content, which may be defined by file type or extension, subject matter, metadata, and/or other contextual information. As an example, a user may synchronize a class or type of content (e.g., pictures, browser bookmarks, and/or open browser tabs) with all other computing devices of the user, at various times, but may synchronize other types of content (e.g., text files and/or spreadsheet files) with only a subset of computing devices of the user (e.g., desktop and/or laptop computers that have relatively large displays and/or HIDs). In this example, a device selection criterion may be defined to select a computing device based in part on a file type or file extension.

For content transfers amongst multiple users, contextual information may be evaluated to identify a contextual relation amongst content and the users. A contextual relation may be based on and/or may relate to specific content (e.g., a computer file named "ABC.doc"), a professional and/or social relationship, a project-based relationship, and/or other factor(s).

A contextual relation may be detected from and/or with respect to, without limitation, electronic communications amongst the users, attachments to the electronic communications, a computer-scheduled appointment associated with one or more of the users, a computer-based directory of user contact information associated with one or more of the users, contextual information related to content (e.g., file type or format, subject matter, and/or metadata), and/or other information. Contextual information relevant to a contextual relation may be extracted from a computing device of a user, a network-based information source (e.g., an Internet-based social or professional networking site and/or e-mail server), and/or other information source(s), or may be inferred from such information.

Methods and systems disclosed herein are not limited to the examples above.

At 104 in FIG. 1, updated contextual information is received. The updated contextual information may include a subset of available contextual information that is that is relevant to context-based criteria defined at 102.

Contextual information may be updated and/or evaluated continuously, periodically, and/or conditionally. Conditional updating and/or evaluating may be based upon an event and/or other contextual information.

As an example, user-computing activity on a workplace-computing device may be retrieved and/or evaluated prior to a scheduled event of the user (e.g., a meeting or airline travel), to identify content that may be appropriate for synchronizing with another computing device.

As another example, a user may have access to multiple computing devices when at a particular location (e.g., home or work), but may typically carry only a mobile computing device when the user is in transit or otherwise away from the location. When the user is away from the location, GPS data from the mobile computing device may be retrieved and/or evaluated from time to time (e.g., periodically). As the user approaches the location, GPS data from the mobile computing device may be retrieved and/or evaluated more frequently. When the user is at the base location, user-location data, user-motion data, user-activity and/or device location data may be monitored periodically or continuously, to determine when to synchronize content amongst computing devices at the base location.

At 106, the updated contextual information is evaluated based on the context-based criteria to determine if the computing activity is to be performed. Where the computing activity includes synchronizing content amongst computing devices, the evaluation at 106 may include evaluating context-based decision criteria to determine if content of a first computing device is to be synchronized with another computing device.

At 108, if the activity is to be performed, processing proceeds to 110, where the computing activity is performed. Where the computing activity includes synchronizing content amongst computing devices, 110 may include evaluating context-based device selection criteria to select one or more other computing devices to content identified at 108.

In an embodiment, content is synchronized amongst multiple computing devices of a user. As an example, George is a researcher working on a paper on his desktop computer at home. He gets up to take a break and go to a local coffee shop for afternoon coffee. A predictive system as disclosed herein recognizes this pattern and predicts that George will pick up his tablet and phone to take to the coffee shop to work on his paper there. The predictive system preloads the latest version of his research paper and the web searches he was performing on the tablet. The predictive system doesn't load this information on his phone because it knows that George does not use his phone for work on his research paper. When George returns home, the predictive system has already pre-loaded the application, content, and context from his tablet (i.e., his latest document and web search results), onto his home desktop computer.

In another embodiment, content of a first user is shared with one or more other users (e.g., as an e-mail attachment and/or via a computer-readable link). As an example, Dave is planning to meet with a colleague, Jim, tomorrow, where Dave will share and discuss a specification for a new widget that Dave is working on. Jim needs a copy of this specification ahead of time (preferably the night before) to review it and ready questions for the meeting with Dave. Dave's device predicts that the specification needs to be shared with Jim and automatically sends an email to Jim with a link to the specification. Dave's device may also send the specification or a link to the specification to another device of Dave's.

In the example above, a contextual relation amongst Dave, Jim, and the specification may be detected from prior computing activity. For example, if Jim previously e-mailed the specification to Dave in advance of an earlier meeting, a context-based criterion may be defined to re-send the specification (or an updated version thereof) to Jim in advance of future-scheduled meetings. In an embodiment, Dave is prompted to confirm that the specification is be shared with Dave with respect to each future-scheduled meeting.

Content to be shared with another user may be provided with or without access controls. Access controls may be configured or assigned with a digital rights management (DMA) technique and/or other access control technique(s). Access controls may be defined, configured, and/or assigned dynamically, and may be based on pre-determined rules and/or context-based criteria.

Further to the example above, Jim may be permitted to access (i.e., read and/or modify) the specification for a period of time prior to and/or subsequent to the meeting with Dave. The former may be useful to permit the Jim to review and/or modify the specification prior to the appointment. The latter may be useful to permit Jim to modify the specification after the meeting, but only for limited amount of time. This may be useful, for example, to obtain feedback and/or edits from Jim while the meeting is still fresh in his mind. The period of time during which Jim is permitted to access the specification, prior to and/or subsequent to the meeting, may be pre-determined, user-configurable, and/or dynamically determined based on contextual information and/or context-based criteria.

Method 100 may be used to proactively and automatically (i.e., with little or no user interaction), load content from a computing device on which the content was most recently modified, to one or more other computing devices. In this way, the latest version of the content is pre-loaded on one or more computing devices, and ready to be used without reliance on the user to remember to perform physical steps to transfer the content. This may permit the user to avoid carrying multiple devices, recreate context, and/or manually transfer content between devices, which may improve productivity of the user. Automated synchronization may be prioritized based on usage patterns, directionality, and/or distance/locations of the user and/or devices relative to one another.

For example, method 100 may further include, subsequent to providing content to a selected computing device, determining that the content has been modified at a computing device, and providing the modified content to one or more of the other computing devices. In an embodiment, modified content is synchronized across all computing devices on which the content resides. In another embodiment, modified content is provided to one or more selected computing devices based on context-based criteria and updated contextual information. Modified content may be provided to a computing device with or without deletion/replacement of a prior version of the content.

Context-based criteria may be defined to dynamically remove data from a device based on contextual information, such as to identify content that is no longer necessary or appropriate on the device. This is referred to herein as dynamic data removal. Dynamic data removal may be used to "age out" content that a user is unlikely to need on a device. Dynamic data removal may also be used to determine which copy or version of a document should be treated as a "master," which may provide more subtlety than "the last updated."

In an embodiment, computing environment configuration parameters are provided to a selected computing device, such as described below with reference to FIG. 2.

Figure 2:
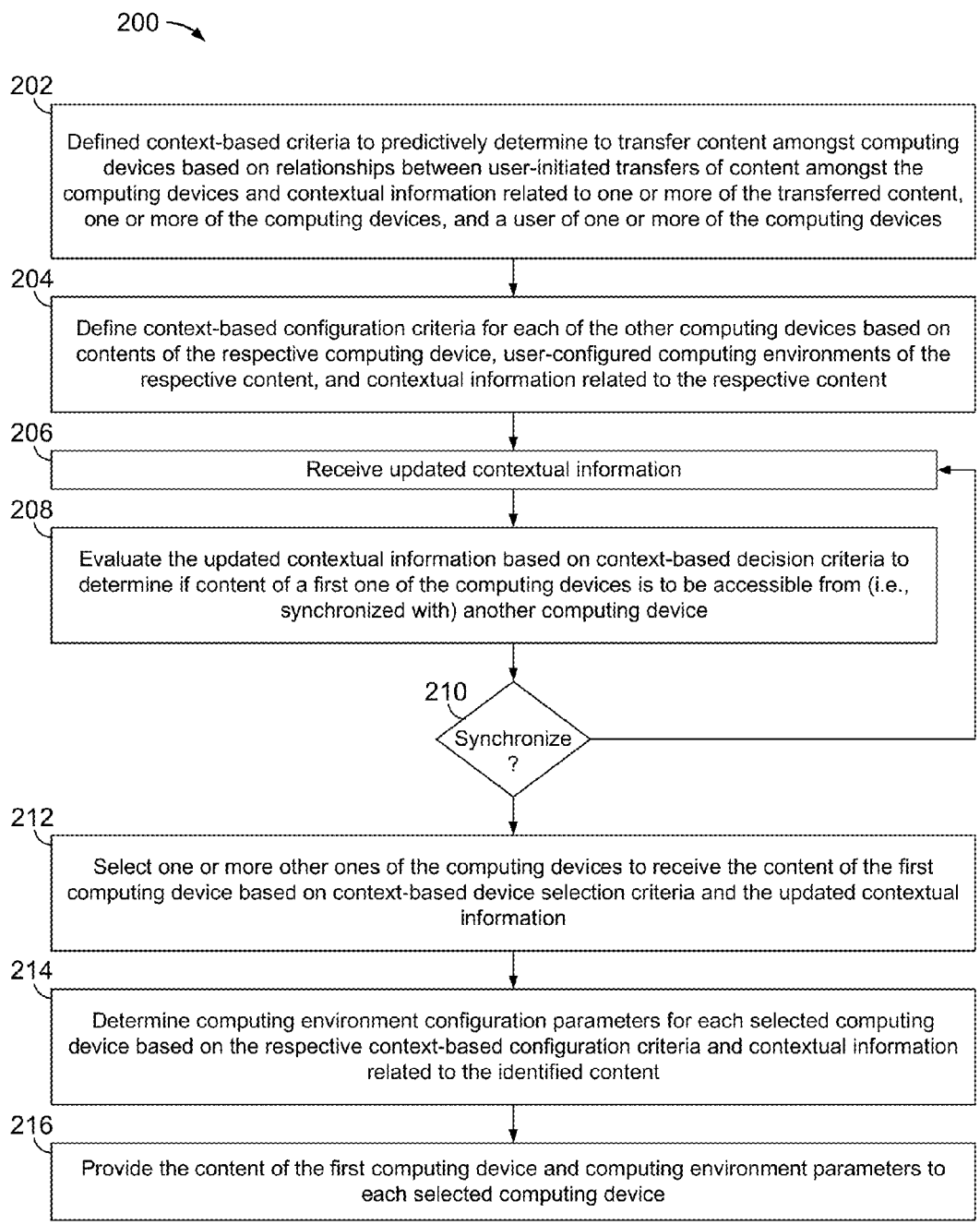
FIG. 2 is a flowchart of a method of providing context-based computing environment configuration parameters to a computing device when content is provided to the computing device.

FIG. 2 is a flowchart of a method 200 of providing context-based computing environment configuration parameters to a computing device when content is provided to the computing device.

At 202, context-based criteria are defined to predictively determine to transfer content amongst computing devices based on relationships between user-initiated transfers of content and contextual information related to one or more of the computing activity, a computing device, and a user of the computing device, such as described above with respect to 102 in FIG. 1.

At 204, context-based configuration criteria are defined for each of the computing devices (or a subset thereof), based on contents of the respective computing device, computing environments of the respective content (e.g., user-configured computing environments), and contextual information related to the respective content (e.g., file type, subject matter, and/or metadata), and/or other contextual information.

At 206, updated contextual information is received, such as described above with respect to 104 in FIG. 1.

At 208, the updated contextual information is evaluated based on context-based selection criteria to determine if content of a first computing device is to be synchronized with another computing device, such as described above with respect to 106 in FIG. 1.

At 210, if content of the first computing device is to be synchronized with another computing device, one or more other computing devices are selected to receive the content at 212 based on the updated contextual information and context-based decision criteria, such as described above with respect to 110 and 110 in FIG. 1.

At 214, computing environment configuration parameters (configuration parameters) are determined for one or selected computing devices based on the respective context-based configuration criteria and contextual information related to the content and/or other contextual information.

At 216, the content and respective configuration parameters are provided to each selected computing device.

Example configuration parameters are described below. Methods and systems disclosed herein are not, however, limited to the example configuration parameters.

Configuration parameters may include configuration parameters for an operating system, an application program, and/or a physical device or resource of a computing device. Examples include, without limitation, access permission/authorization information (e.g., login credentials), and/or a network address or uniform resource locator or identifier (URL/URI).

Configuration parameters may include an instruction and/or a control to pre-load the content, with little or no user interaction. Pre-loading may include storing the content to a storage device or memory location of the selected computing device (e.g., within a pre-determined drive and/or directory), and/or opening the content with an application program.

Pre-loading may be useful to permit a user to effortlessly transition amongst computing devices without having to locate the content in order to open the content and/or store the content at a desired location, without having to select and/or initiate an application program with which to open the content, and/or otherwise manipulate the content.

Configuration parameters may include an indication of an application program with which to open and/or otherwise manipulate the content, which may include a word processing application, a spreadsheet application, an audio, image, and/or video presentation and/or editing application, and/or a browser. The indication may refer to a local application (i.e., installed on a selected computing device), and/or a network and/or cloud-based application.

One or more features disclosed herein may be configured in, without limitation, circuitry, a machine, a computer system, a processor and memory, a computer program encoded within a transitory or non-transitory computer-readable medium, and combinations thereof, and may be configured over multiple computing devices and/or platforms, which may include a combination of a user device and a server system. Information processing by software may be concretely realized by using hardware resources. Example systems, devices, and apparatus are described below with reference to FIGS. 3 through 8.

Figure 3:
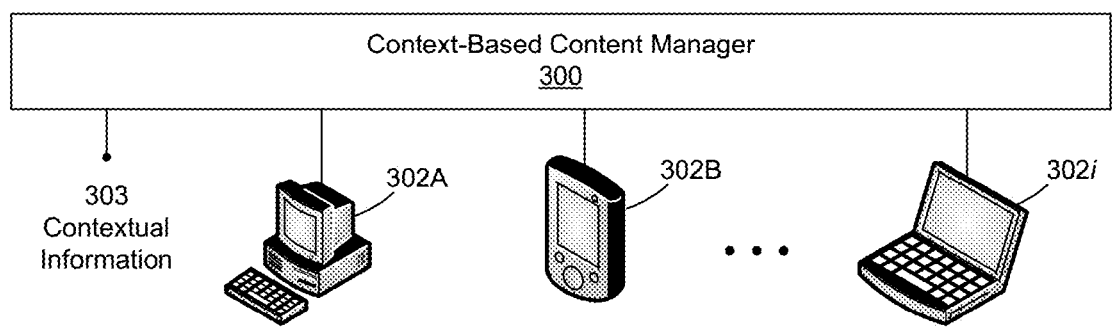
FIG. 3 is a block diagram of a system to predictively perform a computing activity based on user-computing activity and related contextual information.

FIG. 3 is a block diagram of a system 300 to predictively perform a computing activity based on user-computing activity and related contextual information. System 300 may be configured, or configurable to selectively transfer or synchronize content amongst computing devices, such as described below with reference to one or more of FIGS. 4 through 6.

Figure 4:
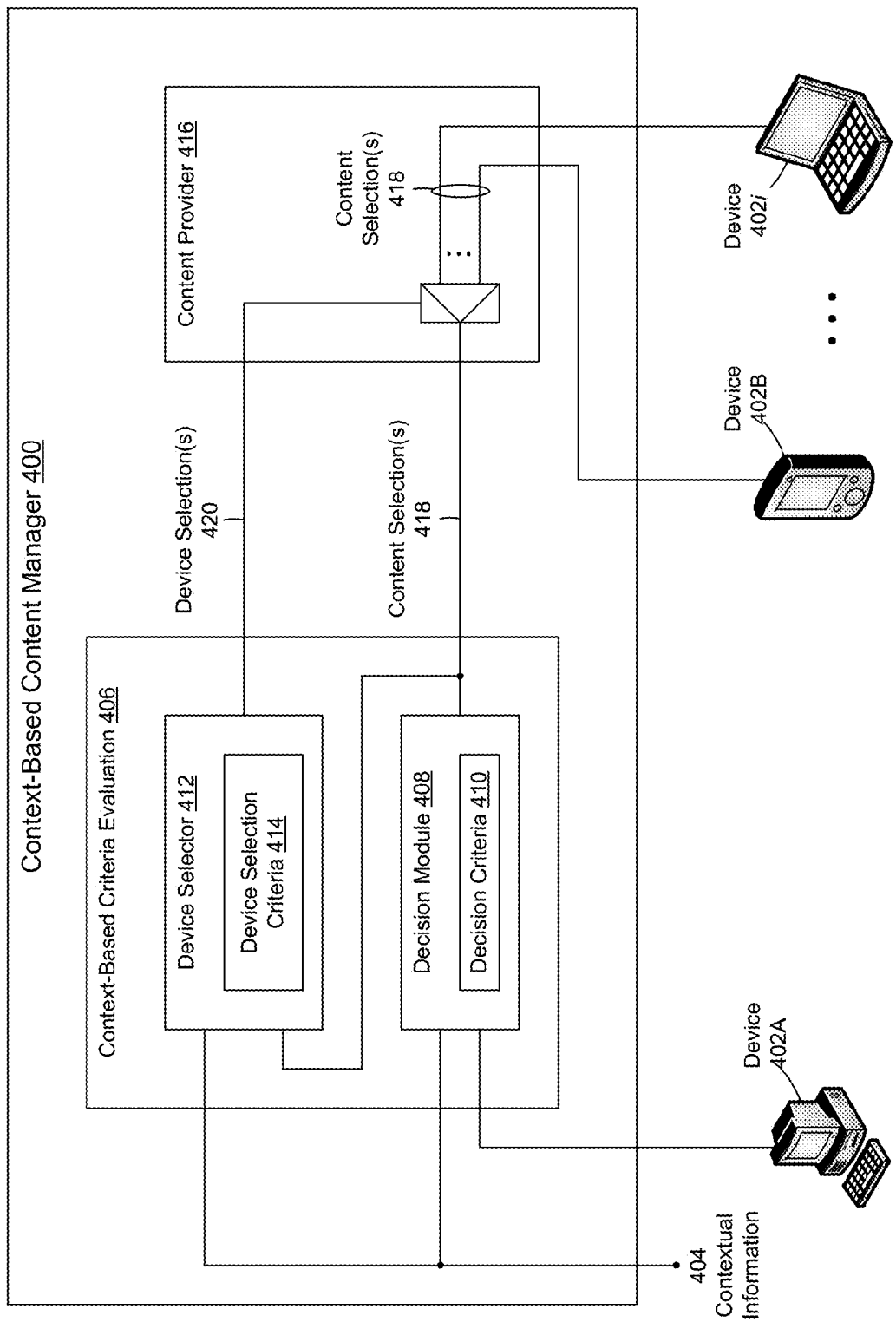
FIG. 4 is a block diagram of a system to selectively transfer/synchronize content amongst computing devices based on contextual information.

FIG. 4 is a block diagram of a system 400 to selectively transfer content amongst computing devices 402 based on contextual information 404. System 400 may be referred to herein as a context-based content manager 400. System 400 includes a context-based criteria evaluation module 406 identify content on a computing device 402 and to select one or more other computing devices 402 to receive the identified content.

In the example of FIG. 4, system 400 is configured to identify and/or select content of a computing device 401A to be provided to one or more of computing devices 402B through 402i. System 400 may be further configured to identify and/or select content of multiple computing devices 402 to be transferred and/or synchronized amongst other ones of computing devices 402.

Context-based criteria evaluation module 406 includes a decision module 408 to determine if content of computing device 402A is to be synchronized with another computing device based on context-based decision criteria 410 and contextual information 404, such as described above with respect to 106 in FIGS. 1 and/or 208 in FIG. 2. Content identified for synchronization is illustrated here as content selection(s) 418, which may include the identified content and/or related identification (e.g., file name, location, and/or computer-readable link thereto).

Context-based criteria evaluation module 406 further includes a device selector 412 to select one or more other computing devices 402 to receive content selection(s) 418 based on device selection criteria 420 and contextual information, such as described above with respect to 110 in FIGS. 1 and/or 212 in FIG. 2. With respect to device selector 412, contextual information may include contextual information 404 and/or content selection(s) 418, as illustrated in FIG. 4.

System 400 further includes a content provider 416 to provide content selection(s) 418 to each selected computing device based on device selection(s) 420, such as described above with respect to 110 in FIGS. 1 and/or 216 in FIG. 2.

Figure 5:
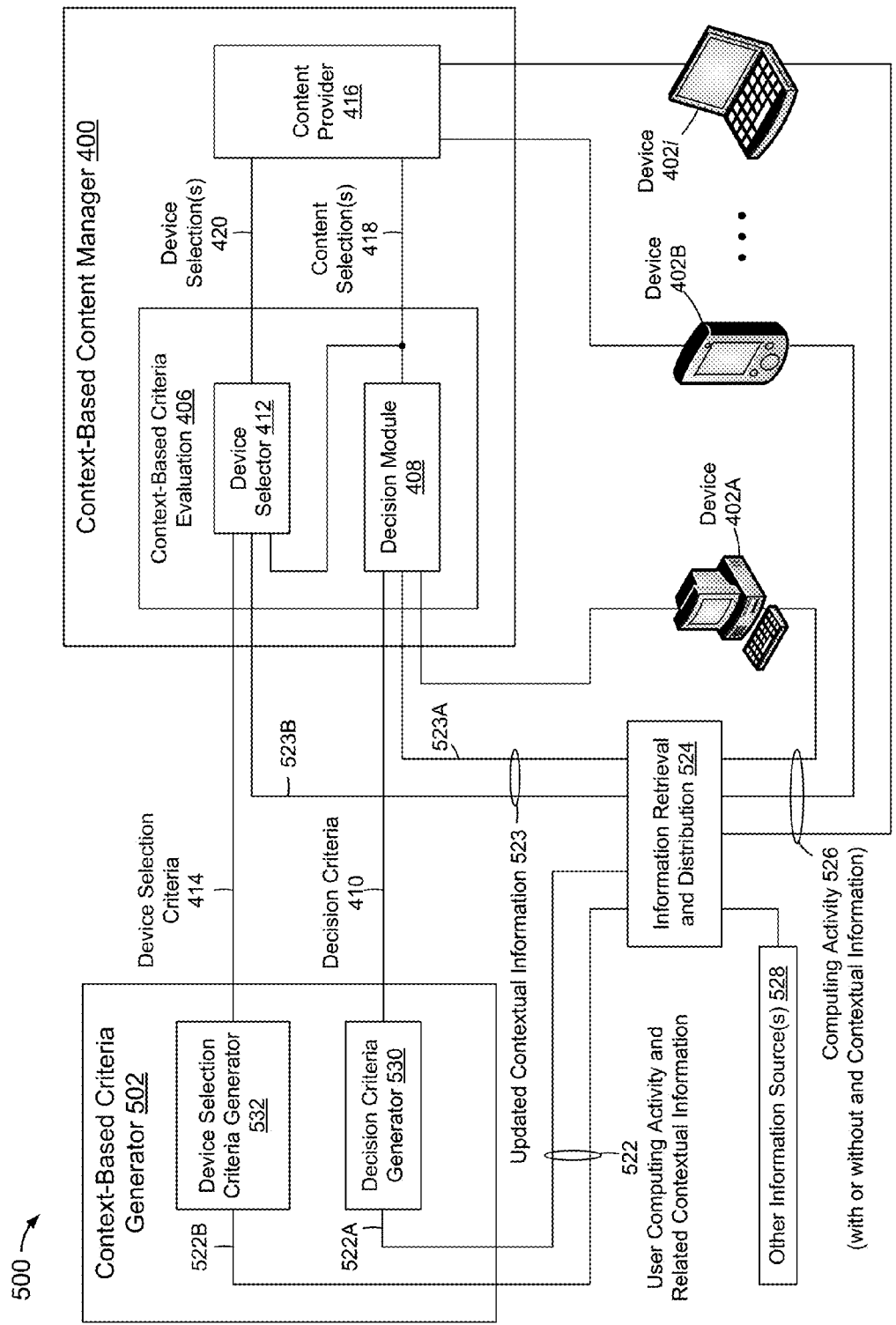
FIG. 5 is a block diagram of a system to define context-based criteria based on user computing activity and related contextual information, and to selectively transfer/synchronize content amongst computing devices based on the context-based criteria and updated contextual information.

FIG. 5 is a block diagram of a system 500 that includes a system 502 to define context-based criteria based on user computing activity and related contextual information 522, such as described above with respect to FIG. 102 in FIGS. 1, and/or 202 in FIG. 2. System 502 may be referred to herein as a context-based criteria generator 502.

In FIG. 5, system 502 is configured to define context-based criteria for system 400 of FIG. 4. System 502 is not, however, limited to the example of system 400.

System 502 includes a decision criteria generator 530 to define decision criteria 410 based on user computing activity and related contextual information 522, or a portion thereof, illustrated here as activity and information 522A.

System 502 further includes a device selection criteria generator 532 to define device selection criteria 420 based on user computing activity and related contextual information 522, or a portion thereof, illustrated here as activity and information 522B.

Context-based criteria generator 502 may be configured to define context-based criteria based on one or more machine-based learning, inference, and/or other artificial intelligence techniques, and/or based on configurable context-based criteria templates, such as described above with reference to 102 in FIG. 1.

System 500 may further include an information retrieval and distribution system 524 to detect, monitor, access, extract, and/or otherwise receive computing activity 526 of one or more computing devices 402 and related and/or contemporaneous contextual information from one or more computing devices 402 and/or other information source(s) 528.

System 524 is further configured to provide or distribute user computing activity and related contextual information 522 to system 502, and to provide updated contextual information 523 to system 400. In FIG. 4, updated contextual information 523 includes updated contextual information 523A and 523B, to be evaluated by decision module 408 and device selector 412, respectively.

Figure 6:
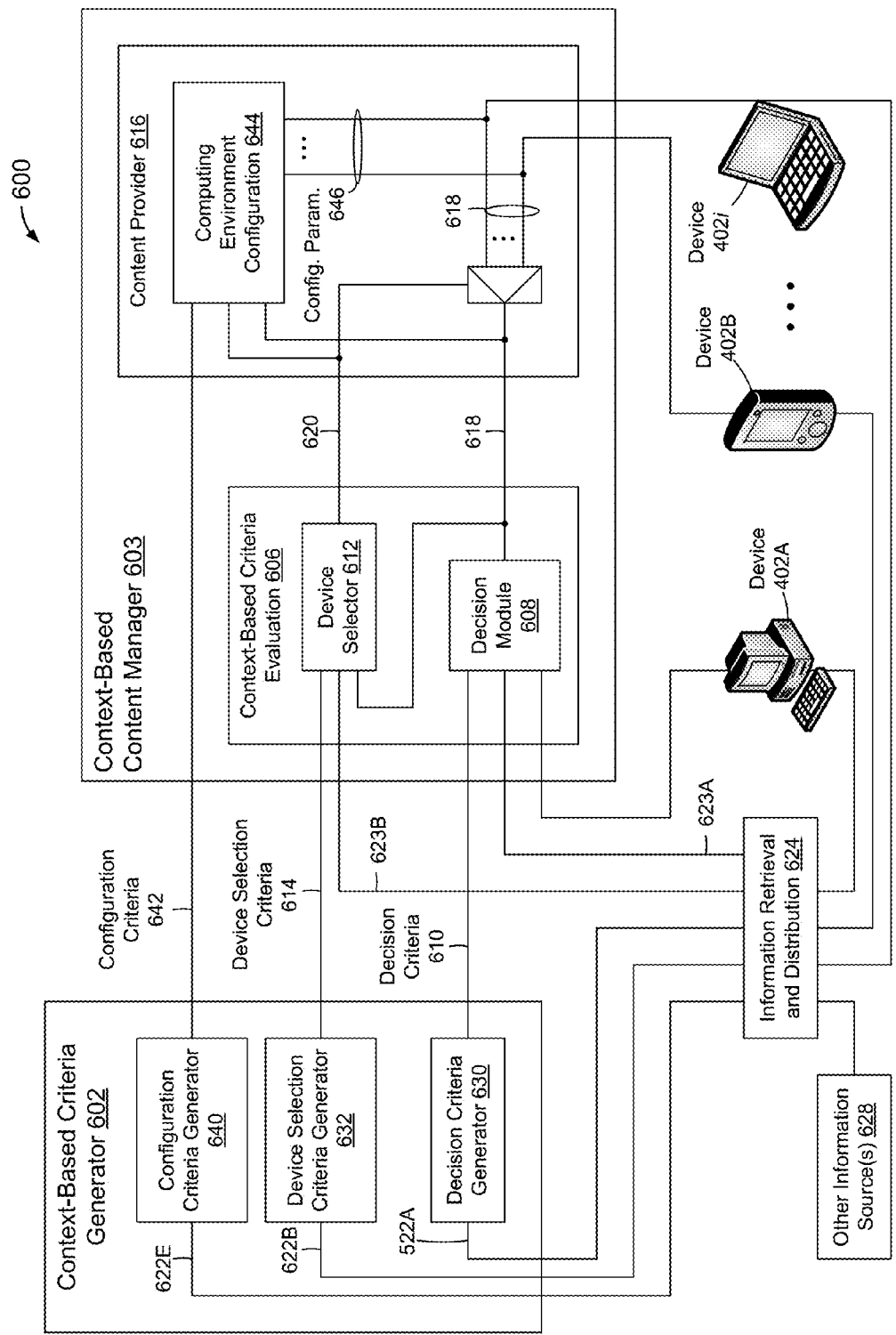
FIG. 6 is a block diagram of a system to selectively transfer content amongst computing devices, and to provide context-based computing environment configuration parameters for the transferred content.

FIG. 6 is a block diagram of a system 600 to selectively transfer content amongst computing devices 602 with context-based computing environment configuration parameters, such as described above with respect to FIG. 2.

System 600 includes a context-based criteria generator 602 and a context-based content manager 603.

Context-based criteria generator 602 includes a decision criteria generator 630 to define decision criteria 610 based on information 622A, such as described above with respect to decision criteria generator 530 in FIG. 5.

Context-based criteria generator 602 further includes a device selection criteria generator 632 to define device selection criteria 614 based on information 622B, such as described above with respect to device selection criteria generator 532 in FIG. 5.

Context-based content manager 603 includes a context-based criterion evaluation module 606, which includes a decision module 608 to identify content on a computing device 602 based on decision criteria 610 and updated contextual information 623A.

Context-based criteria evaluation module 606 further includes a device selector 612 to select one or more other computing devices 602 to receive content selection(s) 618 content based on device selection criteria 614 and updated contextual information 623B and/or content selection(s) 618, such as described in one or more examples above.

Context-based content manager 603 further includes a content provider 616 to provide the content to each selected computing device 602 based on content selection(s) 618 and device selection(s) 620, such as described above with respect to content provider 416 in FIG. 4.

In FIG. 6, context-based criteria generator 602 further includes a configuration criteria generator 640 to define context-based configuration criteria 642 one or more computing devices 602 based on contents of the respective computing device, user-configured computing environments of the respective contents, and contextual information related to the respective contents, such as described above with respect to 204 in FIG. 2.

Content provider 616 further includes a computing environment configuration module 644 to select and provide computing environment configuration parameters 646 to a selected computing device 602 based on configuration criteria 642 associated with the selected computing device and contextual information, such as described above with respect to 214 in FIG. 2. With respect to computing environment configuration module 644, contextual information may include updated contextual information (e.g., from an information retrieval and distribution system 624), and/or information related to content selection(s) 618, as illustrated in FIG. 6.

Figure 7:
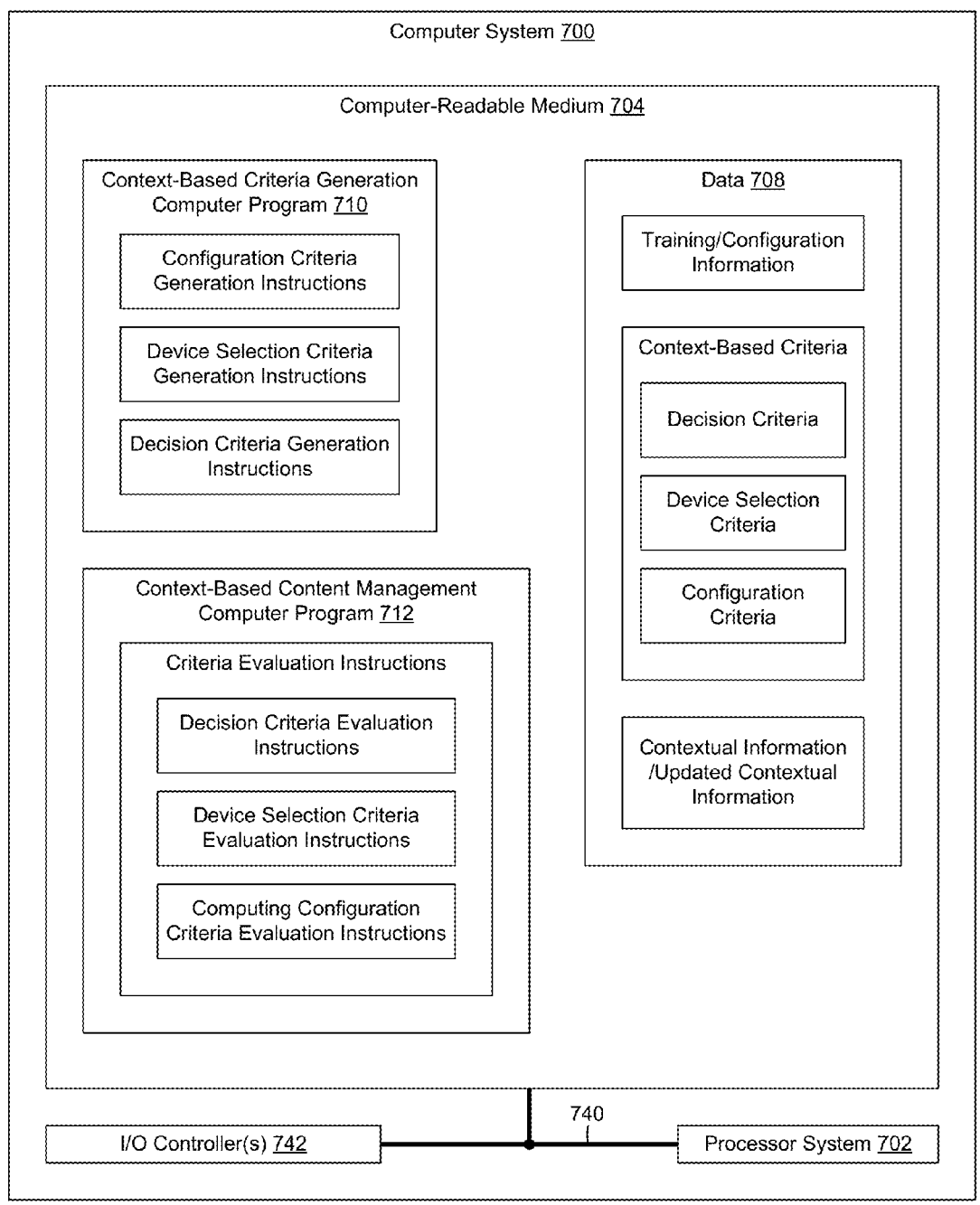
FIG. 7 is a block diagram of a computer system configured to selectively transfer content amongst computing devices based on contextual information.

FIG. 7 is a block diagram of a computer system 700, configured to selectively transfer content amongst computing devices based on contextual information.

Computer system 700 includes a processor 702 to execute computer program instructions encoded within a computer-readable medium 704.

Processor 702 may include one or more instruction processors and/or processor cores, and may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, an application-specific processor, and/or other instruction processor.

Computer readable medium 704 may include a transitory or non-transitory computer-readable medium.

Computer readable medium 704 further includes data 708, to be used by processor 702 during execution of computer program instructions and/or generated by processor 702 during execution of computer program instructions.

In FIG. 7, computer readable medium 704 includes a context-based criteria generation computer program 710 to cause processor 702 to define, construct, and/or configure context-based criteria based on user computing activity and contextual information, such as described in one or more examples above.

Computer readable medium 704 further includes a context-based content management computer program 712 to cause processor 702 to evaluate updated contextual information based on the content-based criteria to identify content on a computing device and to select one or more other computing devices to receive the identified content, such as described in one or more examples above.

Computer system 700 further includes communications infrastructure 740 to communicate amongst devices and/or resources of computer system 700, and one or more input/output (I/O) devices and/or controllers 742 to interface with the computing devices and/or other devices or systems.

In the example of FIG. 7, computer programs 710 and 712 are configured to execute on computer system 700. In another embodiment, computer program 710 and/or computer program 712 are configured to execute on separate computer systems or platforms. In another embodiment, computer program 710 and/or computer program 712 are configured to execute across multiple computer systems or platforms (e.g., a user device and a server, multiple user devices, or multiple user devices and a server).

Methods and systems disclosed herein may be configured within and/or as part of one or more of a variety of devices, such as described below with reference to FIG. 8. Methods and systems disclosed herein are not, however, limited to the examples of FIG. 8.

Figure 8:
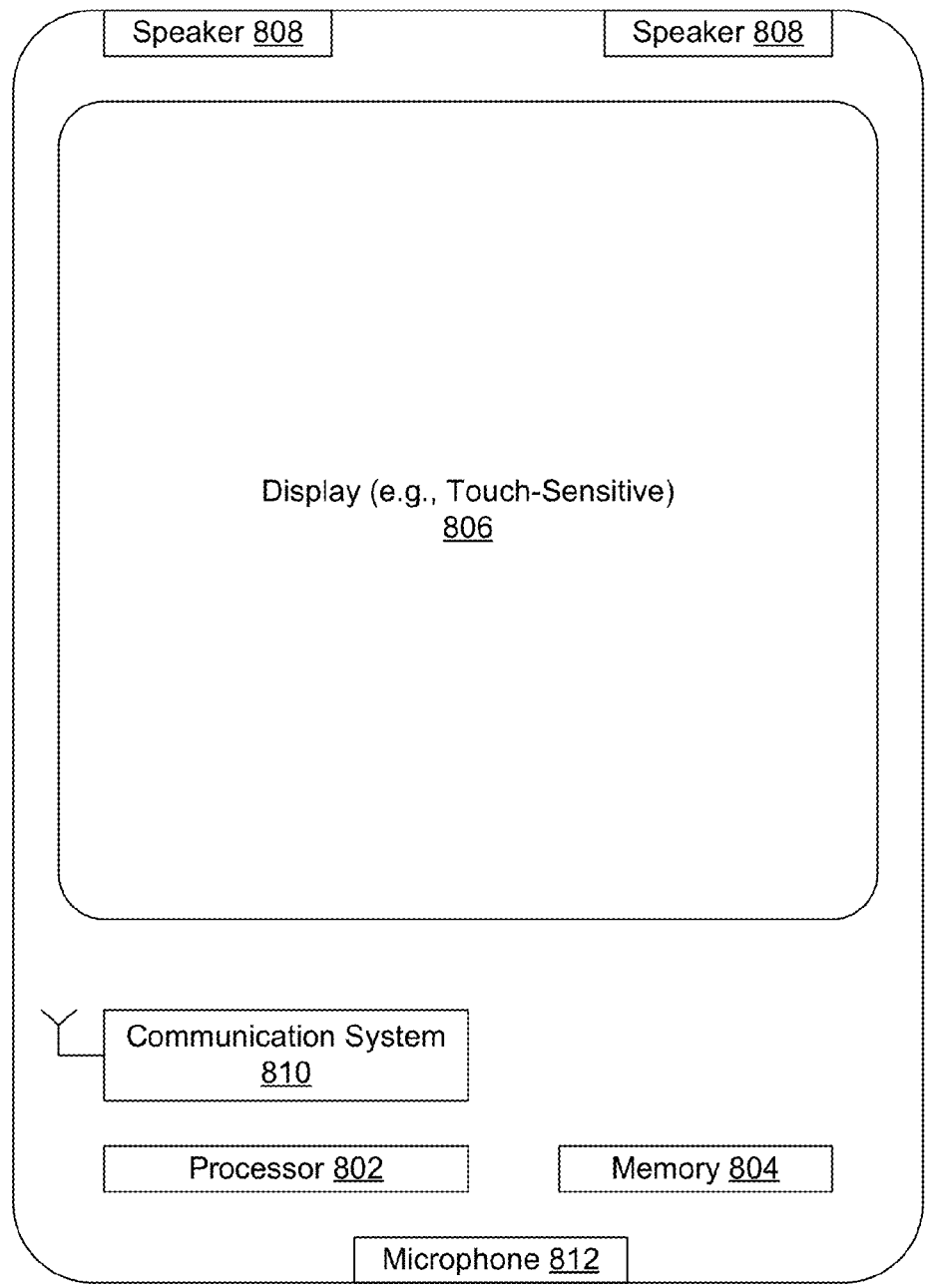
FIG. 8 is a block diagram of a computing device.

FIG. 8 is a block diagram of a computing device 800 that includes a processor 802 and a computer readable medium, which may include memory, cache, an internal storage device or drive, a removable/transportable storage device, and/or other computer-readable medium, illustrated here as memory 804. Processor 802 and memory 804 may be configured as described above with respect to processor 702 and computer-readable medium 704 in FIG. 7.

Device 800 further includes a communication system 810, which may include a wired and/or wireless communication system (e.g., voice and/or packet-based). Device 800 further includes a display 806 and a human interface device (HID), which may include, without limitation, a physical and/or virtual (i.e., display-based) key board, a cursor or pointer device (e.g., a touch and/or motion-sensitive pad), and/or an audio system, illustrated here as including a microphone 812 and speakers 808.

System 800 may be configured as a stationary or portable/hand-held system, and may be configured as, for example, a mobile telephone, a set-top box, a gaming device, and/or a rack-mountable, desk-top, lap-top, notebook, net-book, note-pad, or tablet system, and/or other conventional and/or future-developed system(s). System 800 is not, however, limited to these examples.

Methods and systems disclosed herein may be used to automatically recognize when content needs to be shared from one device to another known device, and to automatically share the content based on contextual behaviors/patterns, such as, without limitation, proximity or anticipated proximity of a user to a computing device another, or meeting scheduled between users.

Methods and systems disclosed herein may be used to learn work and/or behavioral use patterns of a user amongst a portfolio of devices of the user and/or devices of a colleague. For example, a user may choose to work on a research paper on a desktop computer, a tablet, and an ultra-book, but may avoid working on the research paper on a smartphone or second desktop computer of the user.

Methods and systems disclosed herein may be used to predictively send and/or pre-load content, applications, and context (i.e., computing environment) that a user is working on at a first computing device, to another known computing device of the user and/or to a computing device of another user.

Methods and systems disclosed herein may be used to predict which device a user will use next (i.e., transition to), and/or to predict that content should be shared with a device of a colleague.

Methods and systems disclosed herein are not limited to the example uses described above.

EXAMPLES

The following examples pertain to further embodiments.

Example 1 is a machine-implemented method of transferring content amongst computing devices, that include:
  defining context-based criteria to predictively determine to transfer content amongst computing devices based on user-initiated transfers of content amongst the computing devices and contextual information related to one or more of the transferred content, one or more of the computing devices, and a user of one or more of the computing devices;
  evaluating the context-based criteria based on updated contextual information to identify content of a first one of the computing devices, and to select one or more other ones of the computing devices to receive the identified content, wherein the updated contextual information relates to one or more of contents of the first computing device, a user of one or more of the computing devices, and one or more of the computing devices; and
  providing the identified content to each selected computing device.

In an Example 2, the defining includes defining a context-based criterion that relates to one or more of a computing activity, user activity, user computing activity, a pattern of user computing activity, a computer-based user schedule, user location, a change in user location, location of one or more of the computing devices, physical proximity of a user to one or more of the computing devices, and user motion.

In an Example 3, the defining further includes defining a context-based criterion to evaluate one or more of audio captured by the first computing device, image data captured by the first computing device, video data captured by the first computing device, indoor location tracking information, and input to the first computing device from a human interface device.

In an Example 4, the defining includes defining a context-based criterion to transfer a computer file from a computing device of a first user to a computing device of a second user based on a contextual relation amongst the first and second users and the computer-readable file.

In an Example 5, the defining includes defining a context-based criterion to transfer a computer file from a computing device of a first user to a computing device of a second user based on one or more of an electronic communication between the first and second users, an attachment to the electronic communication, a computer-scheduled meeting of the first and second users, and a computer-based directory of user contact information associated with one or more of the first and second users.

In an Example 6, the defining includes defining a context-based criterion to transfer a computer file from a computing device of a first user to a computing device of a second user, and the providing includes one or more of:
  permitting the second user to access the identified content for a first predetermined amount of time prior to a computer-scheduled meeting of the first and second users; and
  permitting the second user to access the identified content for a second predetermined amount of time subsequent to the computer-scheduled meeting.

In an Example 7, the method of Example 1 further includes identifying a modified version of the identified content on one of the computing devices, and providing the modified version of the identified content to one or more other computing device on which the identified content resides.

In an Example 8, the method of Example 1 further includes
  defining context-based deletion criteria to predictively determine to delete content from one or more of the computing devices, based on user-computing activity and related contextual information; and
  evaluating the context-based deletion criteria based on updated related contextual information to identify content to be deleted from one or more of the computing devices.

In an Example 9, the method of Example 1 further includes
  defining context-based configuration criteria for one or more of the computing devices based on contents of the respective computing device, user-configured computing environments of the respective contents, and contextual information related to the respective contents; and
  providing computing environment configuration parameters to a selected computing device based on context-based configuration criteria associated with the selected computing device and the updated contextual information.

In an Example 10, the computing environment configuration parameters include one or more of:
  a control to cause a selected computing device to store the identified content;
  an indication of a location at which to store the identified content;
  an indication of an application program with which to open the identified content; and
  a control to cause a selected computing device to open the identified content with the indicated application program; and
  a parameter with which to configure one or more of an operating system, the application program, and a physical resource of a selected computing device.

In an Example 11, the method of Example 1 further includes assigning an access control policy to the identified content to be provided to a selected computing device based on the contextual information related to one or more of the identified content, the selected computing device, and a user of the selected computing device.

An Example 12 is an apparatus configured to perform the method of any one of Examples 1-11.

An Example 13 is an apparatus that includes means for performing the method of any one of Examples 1-11.

An Example 14 is a processor and memory configured to perform the method as of any one of Examples 1-11.

An Example 15 is a non-transitory computer readable medium encoded with a computer program that includes instructions to cause a processor to perform the method as of any one of Examples 1-11.

An Example 16 is a processor and memory configured to:
  define context-based criteria to predictively determine to transfer content amongst computing devices based on user-initiated transfers of content amongst the computing devices and contextual information related to one or more of the transferred content, one or more of the computing devices, and a user of one or more of the computing devices;
  evaluate the context-based criteria based on updated contextual information to identify content of a first one of the computing devices, and to select one or more other ones of the computing devices to receive the identified content, wherein the updated contextual information relates to one or more of contents of the first computing device, a user of one or more of the computing devices, and one or more of the computing devices; and provide the identified content to each selected computing device.

In an Example 17, the processor and memory are further configured to define a context-based criterion that relates to one or more of a computing activity, a user activity, user computing activity, a pattern of user computing activity, a computer-based user schedule, user location, a change in user location, location of one or more of the computing devices, physical proximity of a user to one or more of the computing devices, and user motion.

In an Example 18, the processor and memory of Example 17 are further configured to define a context-based criterion to evaluate one or more of audio captured by the first computing device, image data captured by the first computing device, video data captured by the first computing device, indoor location tracking information, and input to the first computing device from a human interface device.

In an Example 19, the processor and memory are further configured to define a context-based criterion to transfer a computer file from a computing device of a first user to a computing device of a second user based on a contextual relation amongst the first and second users and the computer-readable file.

In an Example 20, the processor and memory are further configured to define a context-based criterion to transfer a computer file from a computing device of a first user to a computing device of a second user based on one or more of an electronic communication between the first and second users, an attachment to the electronic communication, a computer-scheduled meeting of the first and second users, and a computer-based directory of user contact information associated with one or more of the first and second users.

In an Example 21, the processor and memory are further configured to define a context-based criterion to transfer a computer file from a computing device of a first user to a computing device of a second user, and to perform one or more of:

permit the second user to access the identified content for a first predetermined amount of time prior to a computer-scheduled meeting of the first and second users; and permit the second user to access the identified content for a second predetermined amount of time subsequent to the computer-scheduled meeting.

In an Example 22, the processor and memory are further configured to identify a modified version of the identified content on one of the computing devices, and provide the modified version of the identified content to one or more other computing device on which the identified content resides.

In an Example 23, the processor and memory are further configured to:

define context-based deletion criteria to predictively determine to delete content from one or more of the computing devices, based on user-computing activity and related contextual information; and evaluate the context-based deletion criteria based on updated related contextual information to identify content to be deleted from one or more of the computing devices.

In an Example 24, the processor and memory are further configured to:

define context-based configuration criteria for one or more of the computing devices based on contents of the respective computing device, user-configured computing environments of the respective contents, and contextual information related to the respective contents; and provide computing environment configuration parameters to a selected computing device based on context-based configuration criteria associated with the selected computing device and the updated contextual information.

In an Example 25, the computing environment configuration parameters of Example 24 include one or more of:

a control to cause a selected computing device to store the identified content;

an indication of a location at which to store the identified content;

an indication of an application program with which to open the identified content; and a control to cause a selected computing device to open the identified content with the indicated application program; and a parameter with which to configure one or more of an operating system, the application program, and a physical resource of a selected computing device.

In an Example 26, the wherein the processor and memory are further configured to assign an access control policy to the identified content to be provided to a selected computing device based on the contextual information related to one or more of the identified content, the selected computing device, and a user of the selected computing device.

An Example 27 is a non-transitory computer readable medium encoded with a computer program, including instructions to cause a processor to:

define context-based criteria to predictively determine to transfer content amongst computing devices based on user-initiated transfers of content amongst the computing devices and contextual information related to one or more of the transferred content, one or more of the computing devices, and a user of one or more of the computing devices;

evaluate the context-based criteria based on updated contextual information to identify content of a first one of the computing devices, and to select one or more other ones of the computing devices to receive the identified content, wherein the updated contextual information relates to one or more of contents of the first computing device, a user of one or more of the computing devices, and one or more of the computing devices; and provide the identified content to each selected computing device.

In an Example 28, the computer program further includes instructions to cause the processor to define a context-based criterion that relates to one or more of a computing activity, user activity, user computing activity, a pattern of user computing activity, a computer-based user schedule, user location, a change in user location, location of one or more of the computing devices, physical proximity of a user to one or more of the computing devices, and user motion.

In an Example 29, the computer program of Example 28 further includes instructions to cause the processor to define a context-based criterion to evaluate one or more of audio captured by the first computing device, image data captured by the first computing device, video data captured by the first computing device, indoor location tracking information, and input to the first computing device from a human interface device.

In an Example 30, the computer program further includes instructions to cause the processor to define a context-based criterion to transfer a computer file from a computing device of a first user to a computing device of a second user based on a contextual relation amongst the first and second users and the computer-readable file.

In an Example 31, the computer program further includes instructions to cause the processor to define a context-based criterion to transfer a computer file from a computing device of a first user to a computing device of a second user based on one or more of an electronic communication between the first and second users, an attachment to the electronic communication, a computer-scheduled meeting of the first and second users, and a computer-based directory of user contact information associated with one or more of the first and second users.

In an Example 32, the computer program further includes instructions to cause the processor to define a context-based criterion to transfer a computer file from a computing device of a first user to a computing device of a second user, and to perform one or more of:
  permit the second user to access the identified content for a first predetermined amount of time prior to a computer-scheduled meeting of the first and second users; and
  permit the second user to access the identified content for a second predetermined amount of time subsequent to the computer-scheduled meeting.

In an Example 33, the computer program further includes instructions to cause the processor to identify a modified version of the identified content on one of the computing devices, and provide the modified version of the identified content to one or more other computing device on which the identified content resides.

In an Example 34, the computer program further includes The instructions to cause the processor to:
  define context-based deletion criteria to predictively determine to delete content from one or more of the computing devices, based on user-computing activity and related contextual information; and
  evaluate the context-based deletion criteria based on updated related contextual information to identify content to be deleted from one or more of the computing devices.

In an Example 35, the computer program further includes instructions to cause the processor to:
  define context-based configuration criteria for one or more of the computing devices based on contents of the respective computing device, user-configured computing environments of the respective contents, and contextual information related to the respective contents; and
  provide computing environment configuration parameters to a selected computing device based on context-based configuration criteria associated with the selected computing device and the updated contextual information.

In an Example 36, the computing environment configuration parameters of Example 35 include one or more of:
  a control to cause a selected computing device to store the identified content;
  an indication of a location at which to store the identified content;
  an indication of an application program with which to open the identified content; and
  a control to cause a selected computing device to open the identified content with the indicated application program; and
  a parameter with which to configure one or more of an operating system, the application program, and a physical resource of a selected computing device.

In an Example 37, the computer program further includes instructions to cause the processor to assign an access control policy to the identified content to be provided to a selected computing device based on the contextual information related to one or more of the identified content, the selected computing device, and a user of the selected computing device.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A machine-implemented method of transferring content amongst computing devices, comprising:
  defining context-based criteria to predictively determine to transfer content amongst computing devices based on user-initiated transfers of content amongst the computing devices and contextual information related to one or more of the transferred content, one or more of the computing devices, and a user of one or more of the computing devices;
  evaluating the context-based criteria based on updated contextual information to identify content of a first one of the computing devices, and to select one or more other ones of the computing devices to receive the identified content, wherein the updated contextual information relates to one or more of contents of the first computing device, a user of one or more of the computing devices, and one or more of the computing devices; and
  providing the identified content to each selected computing device.

2. The method of claim 1, wherein the defining includes defining a context-based criterion that relates to one or more of:
  a computing activity,
  user activity,
  user computing activity,
  a pattern of user computing activity,
  a computer-based user schedule,
  user location,
  a change in user location,
  location of one or more of the computing devices,
  physical proximity of a user to one or more of the computing devices, and
  user motion.

3. The method of claim 2, wherein the defining further includes defining a context-based criterion to evaluate one or more of:
  audio captured by the first computing device,
  image data captured by the first computing device,
  video data captured by the first computing device,
  indoor location tracking information, and input to the first computing device from a human interface device.

4. The method of claim 1, wherein the defining includes defining a context-based criterion to transfer a computer file from a computing device of a first user to a computing device of a second user based on a contextual relation amongst the first and second users and the computer-readable file.

5. The method of claim 1, wherein the defining includes defining a context-based criterion to transfer a computer file from a computing device of a first user to a computing device of a second user based on one or more of:
an electronic communication between the first and second users,
an attachment to the electronic communication,
a computer-scheduled meeting of the first and second users, and
a computer-based directory of user contact information associated with one or more of the first and second users.

6. The method of claim 1, wherein the defining includes defining a context-based criterion to transfer a computer file from a computing device of a first user to a computing device of a second user, and wherein the providing includes one or more of:
permitting the second user to access the identified content for a first predetermined amount of time prior to a computer-scheduled meeting of the first and second users; and
permitting the second user to access the identified content for a second predetermined amount of time subsequent to the computer-scheduled meeting.

7. The method of claim 1, further including:
identifying a modified version of the identified content on one of the computing devices; and
providing the modified version of the identified content to one or more other computing device on which the identified content resides.

8. The method of claim 1, further including:
defining context-based deletion criteria to predictively determine to delete content from one or more of the computing devices, based on user-computing activity and related contextual information; and
evaluating the context-based deletion criteria based on updated related contextual information to identify content to be deleted from one or more of the computing devices.

9. The method of claim 1, further including:
defining context-based configuration criteria for one or more of the computing devices based on contents of the respective computing device, user-configured computing environments of the respective contents, and contextual information related to the respective contents; and
providing computing environment configuration parameters to a selected computing device based on context-based configuration criteria associated with the selected computing device and the updated contextual information.

10. The method of claim 9, wherein the computing environment configuration parameters include one or more of:
a control to cause a selected computing device to store the identified content;
an indication of a location at which to store the identified content;
an indication of an application program with which to open the identified content; and
a control to cause a selected computing device to open the identified content with the indicated application program; and
a parameter with which to configure one or more of an operating system, the application program, and a physical resource of a selected computing device.

11. An apparatus, comprising, a processor and memory configured to:
define context-based criteria to predictively determine to transfer content amongst computing devices based on user-initiated transfers of content amongst the computing devices and contextual information related to one or more of the transferred content, one or more of the computing devices, and a user of one or more of the computing devices;
evaluate the context-based criteria based on updated contextual information to identify content of a first one of the computing devices, and to select one or more other ones of the computing devices to receive the identified content, wherein the updated contextual information relates to one or more of contents of the first computing device, a user of one or more of the computing devices, and one or more of the computing devices; and
provide the identified content to each selected computing device.

12. The apparatus of claim 11, wherein the processor and memory are further configured to define a context-based criterion that relates to one or more of:
a computing activity,
user activity,
user computing activity,
a pattern of user computing activity,
a computer-based user schedule,
user location,
a change in user location,
location of one or more of the computing devices,
physical proximity of a user to one or more of the computing devices, and
user motion.

13. The apparatus of claim 12, wherein the processor and memory are further configured to define a context-based criterion to evaluate one or more of:
audio captured by the first computing device,
image data captured by the first computing device,
video data captured by the first computing device,
indoor location tracking information, and
input to the first computing device from a human interface device.

14. The apparatus of claim 11, wherein the processor and memory are further configured to define a context-based criterion to transfer a computer file from a computing device of a first user to a computing device of a second user based on a contextual relation amongst the first and second users and the computer-readable file.

15. The apparatus of claim 11, wherein the processor and memory are further configured to define a context-based criterion to transfer a computer file from a computing device of a first user to a computing device of a second user based on one or more of:
an electronic communication between the first and second users,
an attachment to the electronic communication,
a computer-scheduled meeting of the first and second users, and a computer-based directory of user contact information associated with one or more of the first and second users.

16. A non-transitory computer readable medium encoded with a computer program, including instructions to cause a processor to:
define context-based criteria to predictively determine to transfer content amongst computing devices based on user-initiated transfers of content amongst the computing devices and contextual information related to one or more of the transferred content, one or more of the computing devices, and a user of one or more of the computing devices;
evaluate the context-based criteria based on updated contextual information to identify content of a first one of the computing devices, and to select one or more other ones of the computing devices to receive the identified content, wherein the updated contextual information relates to one or more of contents of the first computing device, a user of one or more of the computing devices, and one or more of the computing devices; and
provide the identified content to each selected computing device.

17. The non-transitory computer readable medium of claim 16, further including instructions to cause the processor to define a context-based criterion that relates to one or more of:
a computing activity,
user activity,
user computing activity,
a pattern of user computing activity,
a computer-based user schedule,
user location,
a change in user location,
location of one or more of the computing devices,
physical proximity of a user to one or more of the computing devices, and
user motion.

18. The non-transitory computer readable medium of claim 17, further including instructions to cause the processor to define a context-based criterion to evaluate one or more of:
audio captured by the first computing device,
image data captured by the first computing device,
video data captured by the first computing device,
indoor location tracking information, and
input to the first computing device from a human interface device.

19. The non-transitory computer readable medium of claim 16, further including instructions to cause the processor to define a context-based criterion to transfer a computer file from a computing device of a first user to a computing device of a second user based on a contextual relation amongst the first and second users and the computer-readable file.

20. The non-transitory computer readable medium of claim 16, further including instructions to cause the processor to define a context-based criterion to transfer a computer file from a computing device of a first user to a computing device of a second user based on one or more of:
an electronic communication between the first and second users,
an attachment to the electronic communication,
a computer-scheduled meeting of the first and second users, and
a computer-based directory of user contact information associated with one or more of the first and second users.

* * * * *